Sept. 10, 1957
S. C. ROCKAFELLOW
2,806,181
METAL DETECTING APPARATUS
Filed Oct. 6, 1954
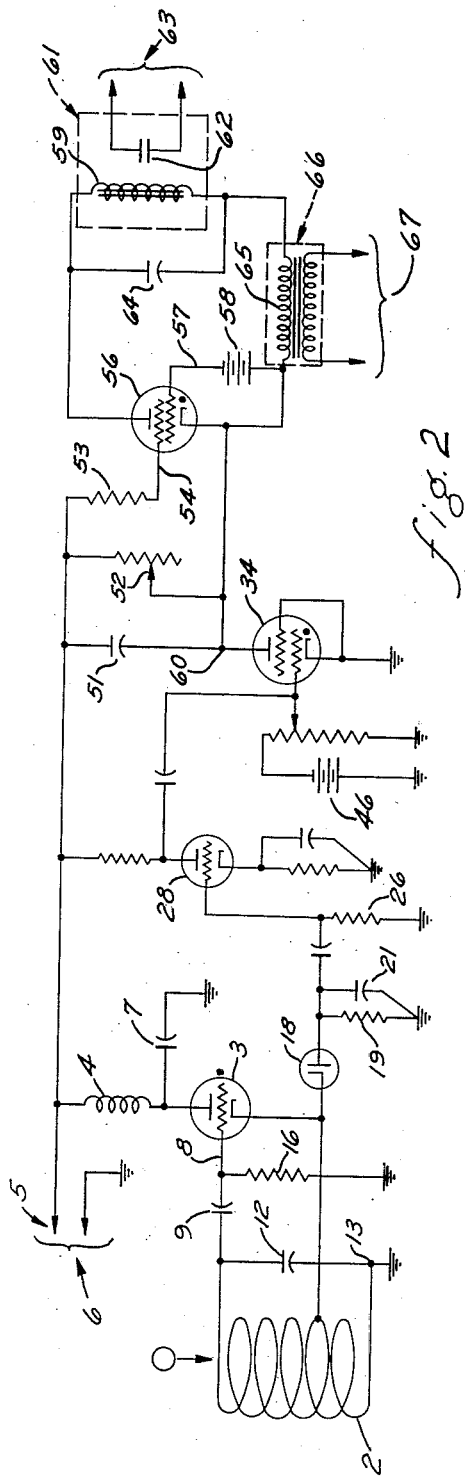
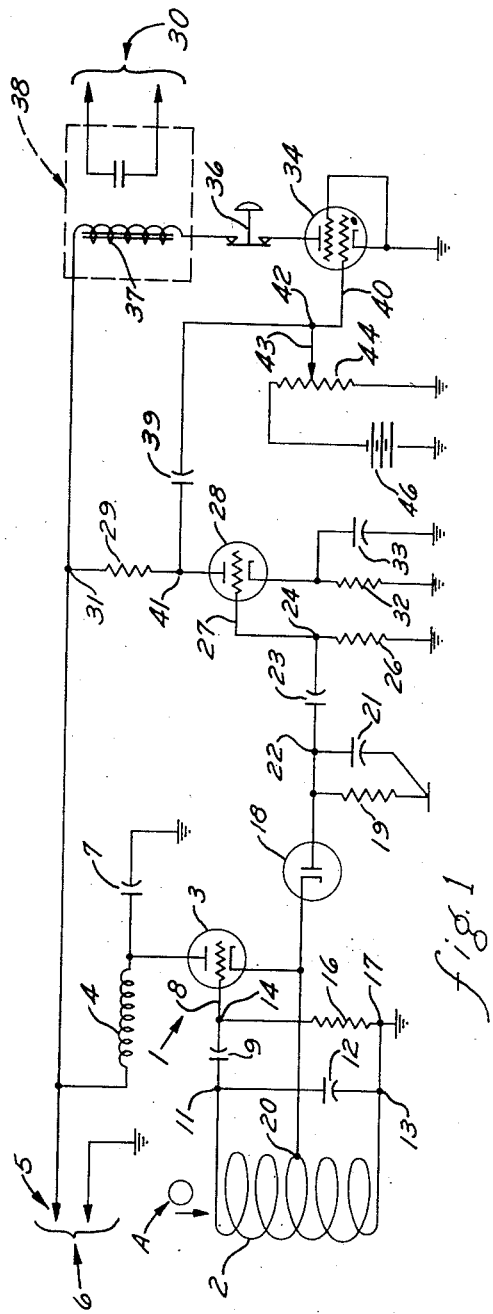
INVENTOR.
STUART C. ROCKAFELLOW
BY
Attorney

United States Patent Office 2,806,181
Patented Sept. 10, 1957

2,806,181

METAL DETECTING APPARATUS

Stuart C. Rockafellow, Farmington, Mich., assignor to Robotron Corporation

Application October 6, 1954, Serial No. 460,733

1 Claim. (Cl. 315—166)

This invention relates to means for the detection of an electrically conductive material, as a metal, whether or not in association with an electrically non-conductive material, and particularly to such a device utilizing a resonant circuit wherein the presence of an electrically conductive material within a coil changes the amplitude of the electrical pulses by reason of eddy current losses.

In a large number of industrial applications it is desirable to determine the presence or absence of an electrically conductive material, as a metal, in association with an electrically non-conductive material, such as to determine the presence of tramp metal in a continuous rubber or plastic extrusion or as in the case of determining the presence of nails in boards being fed to a high-speed saw.

While apparatus for accomplishing these broad purposes has been proposed in the past, it is desirable to provide a circuit capable of accomplishing this purpose with a higher degree of accuracy and with more rugged component parts than has in the past been possible by previously known circuits.

Accordingly, a principal object of the invention has been the provision of a circuit for the detection of an electrically conductive material which will be extremely sensitive and which will not require that the electrically conductive material come into contact with any component part of the detecting system.

Another object of the invention is to provide a device, as aforesaid, which will respond with a high degree of rapidity in order that it may operate a counter in response to a frequently occurring succession of individual electrically conductive articles.

A further object of the invention is to provide a device, as aforesaid, having no moving parts other than the parts conveying the electrically conductive articles or other than a signal device, as a relay, which may be operated by the circuit.

A further object of the invention is to provide a device, as aforesaid, which will require relatively few component parts.

A further object of the invention is to provide a device, as aforesaid, wherein the component parts can be made rugged without involving excessive cost.

A further object of the invention is to provide a device, as aforesaid, which will operate with a high degree of accuracy and reliability.

A further object of the invention is to provide a device, as aforesaid, which will operate in response to any electrically conductive material, not necessarily magnetic material.

A further object of the invention is to provide a device, as aforesaid, which can be readily applied to a variety of control situations.

A further object of the invention is to provide a device, as aforesaid, which is particularly applicable to stamping or pressing equipment as a safety device by which the press or stamping machine will be rendered inoperative in order to prevent the dies from undergoing damage in the event the formed article is not properly ejected from the machine.

Other objects and purposes of the invention will be apparent to persons acquainted with equipment of this general type upon a reading of the following specification and inspection of the accompanying drawings.

In the drawings:

Figure 1 is a circuit diagram of apparatus of general applicability actuating an electro-responsive device in response to metal moving through a predetermined path.

Figure 2 is a circuit diagram of a device utilizing generally the apparatus of Figure 1 and adapted to actuating a signal or a switch if an automatic press or stamping machine fails to eject a formed part.

In general, the invention contemplates a resonant circuit including a coil through which the subject matter being inspected is caused to pass. The presence of metal, or other electrically conductive material, in said subject matter being inspected creates eddy current losses within the resonant circuit and thereby changes the amplitude of its output. The normal output is passed through a rectifier and charges a condenser to a predetermined level. Change in output of the resonant circuit changes the charge on said condenser which in turn modifies the charge on a connected condenser. This latter is applied to an amplifier circuit and then to a thyratron circuit. The output of the thyratron actuates an electro-sensitive device, as a relay.

Turning now to a specific embodiment of the invention, attention is called to Figure 1 wherein is shown a specific circuit by which some of the purposes of the invention can be carried out.

In said circuit, there is provided a resonant circuit 1 which may be any of many conventional forms providing such form includes a pick-up coil 2. As here set forth, the circuit comprises a conventional vacuum triode 3 having its anode connected through a radio frequency choke coil 4 to the positive side 5 of a source 6 of constant D. C. potential. Said anode is also connected through a capacitor 7 to ground. The control electrode, or grid, 8 of the triode 3 is connected through a capacitor 9 to one terminal 11 of the pick-up coil 2. Said terminal 11 is connected through a further capacitor 12 to the other terminal 13 of said pick-up coil 2. A point 14 between the capacitor 9 and the grid 8 of the triode 3 is connected through a resistor 16 and through a point 17 to ground. An intermediate point 20 on the pick-up coil 2 is connected to the cathode of the triode 3 and also to the negative side of a rectifier, as the diode 18. The positive side of said rectifier is connected through a resistor 19 to ground and a capacitor 21 is connected around the resistor 19. A point, as the point 22, between the capacitor 21 and the rectifier 18 is connected through a coupling capacitor 23 to a point 24. Said point 24 is then connected through a resistor 26 to ground and said point 24 is also connected to the grid 27 of an amplifier type triode 28. The anode of the triode 28 is connected through a resistor 29 to a point 31 which in turn is connected to a source of positive potential, which may be the same source, namely source 6, as that to which the resonant circuit 1 is connected. The cathode of the triode 28 is connected to ground through a resistance 32. A capacitor 33 is arranged around the resistor 32.

A thyratron 34 has its anode connected through a reset switch 36, which may be manually operated, and the winding 37 of the relay 38 to the positive side 5 of a source, as the source 6, of constant potential. The contacts of said relay are connected to any suitable means, such as a counter or a signal. One grid of the thyratron 34 is connected to the cathode and the cathode is connected to ground. The other grid of said thyratron is connected through a capacitor 39 to a point 41 intermediate the resistor 29 and the anode of the tube 28. A point 42 located between the capacitor 39 and the grid 40 is connected to the slider 43 of a potentiometer 44. One end of the resistance portion of said potentiometer is connected to ground and thence to the positive side of a source 46 of constant potential, as a battery, and the other end of said resistance is connected to the negative side of said source 46.

The operation of said device is simple and reliable and may be explained by assuming, for the purposes of illustration only, that a plurality of electrically conductive, as metallic, articles are, as indicated at "A," being passed through the coil 2. Whether said metallic articles are being dropped successively through a vertically positioned coil, are embedded within a non-conductive material, as a rubber extrusion, or other means exist for their conveyance, is immaterial. It is important only that said articles pass through said coil successively with respect to each other. The parts comprising the source 6, the coil 4, the tube 3, the capacitor 12 and the pick-up coil 2 all comprise a resonant circuit of known type and its operation will be readily understood. The output of said resonant circuit is taken intermediate the ends of the pick-up coil 2, as at the point 20, and delivered to the cathode of the diode 18. As will be understood, the frequency of the resonant circuit will in a conventional manner be dependent upon the inductance of the coil 2 and the capacity of the capacitor 12. For example, I have used a frequency of about 200 kc. which is a sufficiently high frequency to operate effectively and is a sufficiently low frequency to avoid radio interference. The power required is small, such as about $\frac{1}{10}$ of a watt. The output of the diode 18 maintains the capacitor 21 at a substantially constant level of charge so long as no change occurs in or with respect to the coil 2. However, when an electrically conductive article enters the pick-up coil 2, the amplitude of oscillations occurring in said resonant circuit decreases due to current absorption of the metal. When the amplitude of said oscillations decreases, the voltage across the capacitor 21 also decreases and this effects a change in the coupling capacitor 23. Such change constitutes the signal which is fed through grid 27 to the amplifier circuit including the tube 28. It will be understood that although only one amplifying stage is here shown, more such amplifying stages may be used if desired. The output of the amplifier appears at the point 41 and passes through the coupling capacitor 39 to the point 42. Normally the negative potential of the source 46 is applied to the control electrode 40 to hold the thyratron 34 blocked and the relay 38 de-energized. However, when a positive pulse originating in the amplifier circuit and appearing at the point 41 is transmitted to the point 42, this will overcome the negative blocking potential applied by the source 46 to the control electrode 40 and render the thyratron 34 conductive. This will actuate the relay 38 and produce the desired signal at the output terminals 30 of the circuit. The apparatus may then be reset manually by depressing the reset switch 36. This breaks the thyratron circuit and restores it to its de-energized condition.

It will be recognized that any of many types of devices can be actuated by the energy produced at the output terminals 30, such as an alarm, a counter or a further relay to open a power switch or other desired functions.

Modification

One particularly advantageous modification of the foregoing described circuit is illustrated in Figure 2 where the device functions as a safety device applicable, for example, to a machine, such as a stamping machine or a press, in order to stop the machine in the event a formed part is not ejected.

It will be apparent that this modification is merely illustrative of many other modifications which may be made embodying the substance and employing the functions of the circuit illustrated in Figure 1.

In the circuit illustrated in Figure 2, all of the parts which are identical with the apparatus shown in Figure 1 are identified by numerals similar to those used in Figure 1 and accordingly description thereof will not be needed.

The anode of the thyratron 34 is connected through a capacitor 51 in the circuit of Figure 2 instead of through the winding 37 in the circuit of Figure 1. A variable resistor 52 is connected around the capacitor 51. The positive side of the capacitor 51, that is, the side opposite the side connected to the anode of the thyratron 34, is connected through a protective resistor 53 to the control electrode 54 of a thyratron 56. Another control electrode 57 of said thyratron is connected to the negative side of a source 58 of constant potential and the positive side thereof is connected to the cathode of the thyratron 56. Said cathode is also connected to a point 60 intermediate the capacitor 51 and the anode of the thyratron 34. The anode of the thyratron 56 is connected through the winding 59 of a relay 61 whose contacts 62 are connected to a pair of output terminals 63. A holding capacitor 64 is connected around the winding 59. The side of the winding 59 opposite the anode of the thyratron 56 is then connected to one end of a transformer secondary winding 65 and the other end of said transformer secondary winding is connected to the cathode of the thyratron 56. The primary winding of said transformer 66 is connected to a source 67 of alternating current.

The operation of this device will be readily understood.

Commencing with the resonant circuit including the pick-up coil 2 in oscillating condition, and the source 67 supplying a regularly alternating potential to the secondary winding 65, the apparatus is in condition for operation. As above set forth, the circuit effects a substantially constant potential across the capacitor 21 and applies voltage across the principal electrodes of the thyratrons 34 and 56, but due to the negative voltage applied by the batteries 46 and 58 to the thyratron grids, the thyratrons do not conduct.

When a piece of electrically conductive material passes through the coil 2, this reacts in the manner indicated above to effect conduction through the thyratron 34 and this places a substantial potential across the capacitor 51. This potential appears on the grid 54, overcomes the negative bias on the grid 57 of the thyratron 56 and thereby renders said thyratron 56 conductive to the next pulse in the proper direction from the source 67. Such pulse energizes the winding 59 of the relay 61 and the contacts 62 are actuated. Conduction of the thyratron 56 will also charge the capacitor 64 and this capacitor will hold the relay 61 energized until its charge drains through the winding 59 to below a predetermined level, at which time the relay 61 becomes de-energized. Thus, the capacitor 64 functions to hold the winding 59 energized during the reverse pulses from the alternating source.

It will be recognized that the charge on the capacitor 51 will drain out through the resistor 52 at a rate controllable by the value of said resistor.

Accordingly, if the capacitor 51 becomes charged, in response to electrically conductive articles passing through the pick-up coil 2 at a predetermined frequency, said frequency being adjustable by adjustment of the variable resistor 52, pulses will be passed through the thyratron 56 with sufficient frequency to maintain the capacitor 64 charged and the relay 61 energized.

Thus, if the articles being formed on, for example, a punch press, are discharged through the pick-up coil 2 at regular intervals, the contacts 62 will be held in a predetermined position continuously, such predetermined position, for example, being to energize the solenoid which actuates the press at the top of its stroke or, if a normally closed relay is used, its contacts may actuate positive stop mechanism for the press. Thus, so long as the articles pass through the pick-up coil 2 at regular intervals, the relay 61 will be held in a predetermined condition and the press will operate normally. If, however, the press fails to eject a formed part so that the regularity of the passage of articles through the pick-up coil 2 is interrupted, then the capacitor 51 will not be re-energized and the relay 61 will become de-energized, thus actuating whatever signaling or control mechanism is provided responsive thereto.

Various other modifications of the apparatus herein disclosed will be apparent to persons acquainted with equipment of this general type and such modifications are intended to fall within the terms of the hereinafter appended claim, excepting as said claim by its own terms expressly require otherwise.

I claim:

A detecting apparatus, comprising in combination: an oscillator circuit, including a coil, passage of an article to be detected near said coil being adapted to change the magnitude of the generated voltage of said oscillator circuit; a rectifier; an amplifier circuit and means connecting said oscillator circuit through said rectifier to said amplifier circuit, such that a change in the magnitude of said generated voltage from said oscillator circuit will apply a signal to said amplifier circuit; a thyratron circuit and means holding said thyratron circuit normally non-conductive; means connecting said amplifier circuit to said thyratron circuit, such that signals of predetermined magnitude from said amplifier circuit will cause conduction of said thyratron circuit; a controlled circuit connected to said thyratron circuit, said controlled circuit including a capacitor connected to the anode of said thyratron circuit; a timing resistance in parallel with said capacitor; a normally blocked second thyratron, said second thyratron being connected to said capacitor such that said second thyratron will be conductive so long as said capacitor remains charged by the output from said thyratron circuit; a load in the anode circuit of said second thyratron and a second capacitor in parallel with said winding; a transformer having its primary winding connected to a source of alternating potential and its secondary winding in series with said second thyratron and said load, whereby said load will remain energized from said alternating source so long as pulses of potential appear with predetermined regularity from said thyratron circuit and will permit said load to become de-energized when pulses fail to appear from said thyratron circuit for a period of time exceeding a predetermined interval.

References Cited in the file of this patent

UNITED STATES PATENTS

| 2,337,132 | Shaw | Dec. 21, 1943 |
| 2,267,884 | Zuschlag | Dec. 30, 1951 |
| 2,580,670 | Gilbert | Jan. 1, 1952 |

OTHER REFERENCES

Electronics, July 1949, pages 80–83, article by Urbach.